J. B., G. H. & N. D. BAKER.
INDICATOR.
APPLICATION FILED MAR. 6, 1914.
1,124,100.
Patented Jan. 5, 1915.
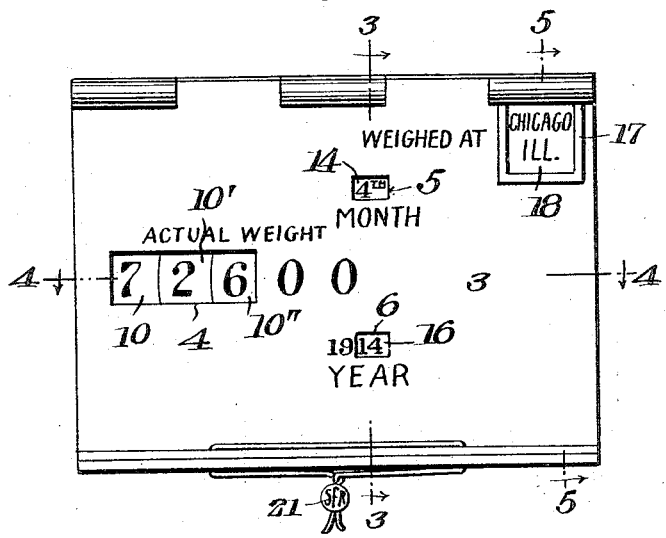
Fig. 1.
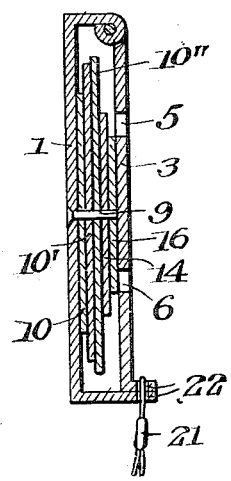
Fig. 3.
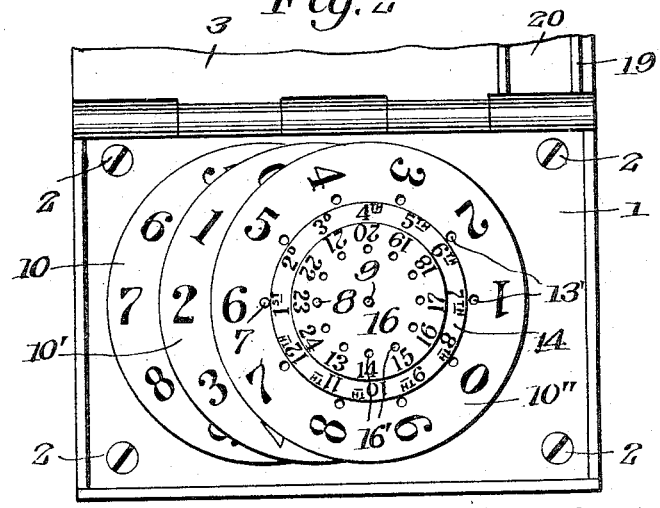
Fig. 2.
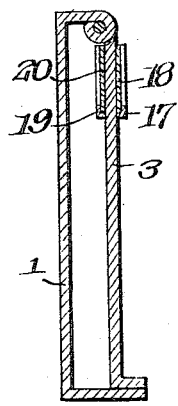
Fig. 5.
Fig. 4.
Witnesses
Hugh Hill
James A. Koehl
Inventors
James B. Baker
Gwyn H. Baker
Ned D. Baker
By Victor J. Evans
Attorney

UNITED STATES PATENT OFFICE.

JAMES B. BAKER, GWYN H. BAKER, AND NED D. BAKER, OF OAKLAND, CALIFORNIA.

INDICATOR.

1,124,100.  Specification of Letters Patent.  Patented Jan. 5, 1915.

Application filed March 6, 1914. Serial No. 822,979.

*To all whom it may concern:*

Be it known that we, JAMES B. BAKER, GWYN H. BAKER, and NED D. BAKER, citizens of the United States, residing at Oakland, in the county of Alameda and State of California, have invented new and useful Improvements in Indicators, of which the following is a specification.

This invention relates to indicators, and particularly to one intended to indicate the net weight of vehicles and the date determined, an object of the invention being to provide a structure of this character in which the date to be indicated and the number of pounds weight can be quickly changed to accord with the conditions. The device is designed particularly for use upon frieght cars where it is necessary to alter the weight from time to time as the weight varies, the rule of some roads being that all cars must be weighed empty after every three months and any change in the tare made accordingly and exhibited or displayed from an appropriate part of the car.

Another object of the invention is the provision of companion disks, each containing a series of digits operating beneath a display opening so that the number of pounds forming the weight can be correctly indicated.

A further object of the invention is the provision of an indicator having means to positively prevent the indicating elements thereof from being tampered with without detection.

A still further object of the invention is the provision of an indicator consisting of revolubly mounted indicating disks and means whereby the mounting for one disk forms a locking means for the other disk and the mountings of the several disks being thereby made to coöperate toward a retention of all of the disks against movement from their set and intended positions.

With these and other objects in view, the invention consists of certain novel features of construction, combination and arrangement of parts, as will be hereinafter described and claimed.

In the accompanying drawings:—Figure 1 is a perspective view of the indicator; Fig. 2 is a front view thereof, showing the cover in an open position; Fig. 3 is a section taken on the line 3—3 of Fig. 1; Fig. 4 is a section, taken on the line 4—4 of Fig. 1; and Fig. 5 is a section on the line 5—5 of Fig. 1.

We contemplate the provision of an indicating device for the purpose heretofore mentioned which may be used in a manner which will eliminate the necessity of stenciling or painting the figures on the side of the car and we propose to employ such mechanism or an indicator in which the authentic weight as displayed by the indicator cannot be tampered with without detection. In practice, it is desirable to construct an indicator which will consist of a main attaching plate 1 adapted to be secured by fastenings 2 to the side of the car. Hinged to the upper edge of the plate is a cover or housing plate 3, which is provided with a view or display opening 4, from which the weight indicating members or the mechanism to be subsequently referred to can be properly displayed. In addition to such opening the cover or housing plate 3 is provided with a display or view opening 5 and a similar display or view opening 6.

Extending from one surface of the attaching plate 1 are horizontal alined pins 7, 8 and 9 and mounted to respectively revolve on these pins are disks 10—10'—10''. These disks are substantially of identical formation, and each is provided on its display side with a circular series of numbers which may be brought into single registration with the display opening 4, whereby the number of one disk may be properly associated with the numbers of adjacent or companion disks, and all of the disks may be used for the formation of the total number of pounds to be indicated. The disk 10 is provided with two circular series of passages 11 and 11', which respectively receive the pins 8 and 9. The next adjacent disk 10' is provided with two circular series of passages 12 and 12' which respectively receive the pins 7 and 9, while the last disk $10^2$ is provided with two series of passages 12 and 13 respectively receiving the pins 7 and 9. The pins each have a length whereby the indicating disks above mentioned may be properly accommodated and associated relatively, so that the numbers of the different disks which are arranged to indicate the total number of pounds weight may be held in fixed conditions at the back of the display opening 4. The pin 9 supports a disk 14, the latter having its display surface provided with a circular series of numbers which may be singly exhibited from the opening 5. This last mentioned disk is provided with a circular series of passages 15 which are adapted to interchangeably receive the pin 8 and in a manner similar to that of locking the main indicating disks 10, 10′ and 10″. The said disk 14 will also be held against rotation after the required number of the disk has been brought into registration with the opening 5. The numbers on the said disk 14 correspond with the number of calendar months, and to one side of the opening 5 and suitably formed on the closure or housing plate 3 is indicia such as the word "Month." The said pin 9 is further adapted to support a year indicating disk 16, the numbers of the disk being adapted to be brought into single registration with the display opening 6, and on the plate 3 at a point adjacent the said opening 6 is indicia such as the word "Year." This last mentioned disk is provided with a circular series of openings 16′ which are adapted to interchangeably receive the pin 8.

At the upper right-hand corner of the plate 3 is a pocket 17, in which a card 18 is adapted to be placed and on said card is designed to be placed indicia indicated by the point where the weight is originally taken. At the opposite side of the said plate 3 is a second pocket 19, which is adapted to contain the usual scale ticket 20, where a self registering beam-type of scale is used.

After the car is weighed in the usual manner the operator lifts the plate 3 to a position which will permit of a proper exposure of all of the indicating disks of the mechanism. These disks are then individually operated and the numbers according to the data to be displayed are set, so as to permit of their being accurately viewed from the display openings of the said cover plate 3 when the latter is again adjusted to its closed position. After the necessary data has been properly collected and displayed from the indicator as above named a seal 21 of any suitable well known form may be placed through receiving portions 22 on the plates 1 and 3 and the latter is thus held under ordinary conditions against being opened. In other words, the mechanism is then securely held against being tampered with without detection. The closure plate 3 is also disposed with such relation to the inner pocket which receives the scale ticket as to prevent said ticket from being lost from the pocket when the plate 3 is closed.

We claim:—

1. An indicator comprising an attaching member having a series of horizontally alined pins, a disk mounted on each pin, the disks of the adjacent pins overlapping one another, the said disks each having a series of passages therein, the pin of one disk having interchangeable connection in the passages of the next adjacent disk.

2. An indicator comprising an attaching member having a series of horizontally alined pins, a disk mounted on each pin, the disks of the adjacent pins overlapping one another, the said disks each having a series of passages therein, the pin of one disk having interchangeable connection in the passages of the next adjacent disk, and a closure plate hinged to the attaching plate and having a display opening for exhibiting predetermined numbers of said disks.

3. An indicator comprising a member having a slot and superposed openings, a series of horizontal alined pins mounted in said member, disks, the centers of which are mounted respectively on said pins, the said disks being of the same diameter so that when arranged on said pins they will overlap each other, the disks having indicia thereon visible through said slot, the disks on each pin having connection with the adjacent pins so as to be held against rotation thereby and a plurality of disks of different diameters mounted on one of the pins and having connection with an adjacent pin whereby to be held against rotation thereby, the said last disks having indicia thereon respectively visible through said superposed openings.

In testimony whereof we affix our signatures in presence of two witnesses.

JAMES B. BAKER.
GWYN H. BAKER.
NED D. BAKER.

Witnesses:
  Geo. R. Payne,
  Pedro Saiz.

Copies of this patent may be obtained for five cents each, by addressing the "Commissioner of Patents, Washington, D. C."